United States Patent Office 3,148,163
Patented Sept. 8, 1964

3,148,163
WHITENED AND STABILIZED POLY-
URETHANE FOAMS
Harlan B. Freyermuth, Easton, Pa., assignor to General
Aniline & Film Corporation, New York, N.Y., a corporation of Delaware
No Drawing. Filed Dec. 12, 1960. Ser. No. 75,100
7 Claims. (Cl. 260—2.5)

This invention relates to a new composition of matter such as polyurethane products whitened and stabilized against discoloration when exposed to air.

Polyurethane foams are important articles of commerce, e.g., rigid polyurethane foams are being used for thermal insulation and acoustical tile and resilient polyurethane foams are finding abundant uses as clothing interliners, pillows, mattresses and the like.

As normally made, the polyurethane foam material is white or lightly colored. However, if desired, the foam material may be colored in predetermined shades by incorporating therein during manufacture suitable pigments or dyes, or after manufacture by treatment with substantive or acid dyestuffs. Unfortunately, after manufacture and during exposure to ambient atmospheric conditions, the foam undergoes a progressive discoloration and yellowing. This is particularly evident when aromatic diisocyanates have been used in the production of the polyurethane foam. Although such discoloration and yellowing does not affect the physical properties of the foam, such as, tensile and tear strength, compression modulus, etc., the yellowed appearance of the foam is aesthetically undesirable. This shortcoming has markedly detracted from both eye appeal and commercial utility of polyurethane products.

It is believed that the yellowing of polyurethane foams is due to oxidation of constituents containing free amino groups, the oxidation being strongly catalyzed by light and bases. It is known in the art that wrapping the foam material in cellophane or polyethylene sheeting, or storing the foam in the dark, greately retards the discoloration of the foam. However, such precautions are not always practicable.

It is the object of this invention to provide whitened and stabilized polyurethane foams.

Another object of this invention is the provision of improved polyurethane foams which will not discolor upon exposure to the air.

A further object of this invention is the provision of polyurethane foams which are whitened and stabilized against discoloration upon exposure to air by the use of a spirit- or oil-soluble brightener.

These and other objects will become apparent in the following description.

In accordance with this invention a polyurethane product is whitened and stabilized against yellowing, i.e., discoloration, by having incorporated therein a very small amount of a spirit- or oil-soluble brightening having the structures:

(A) 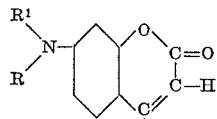

(B) 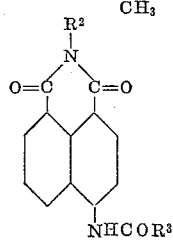

(C) 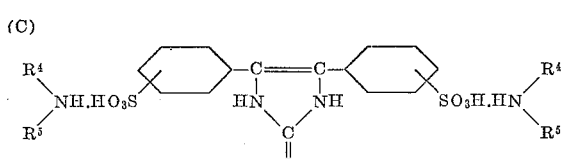

wherein R and $R^1$ may be hydrogen, lower alkyl groups such as —$C_2H_5$ and —$CH_3$, or lower hydroxyalkyl groups such as —$CH_2OH$, $CH_2CH_2OH$, $(CH_2$—$CH_2OH)_2$; $R^2$ is hydrogen, an aliphatic radical such as alkyl, i.e., methyl, ethyl, propyl, butyl, isobutyl, amyl, hexyl, octyl, isooctyl, decyl, dodecyl, tetradecyl, octadecyl and the like; hydroxy alkyl such as hydroxy methyl, hydroxy propyl and the like; carboxy alkyl such as carboxy methyl, carboxy ethyl and the like; cyclo alkyl such as cyclopentyl, cyclohexyl and the like; aralkyl such as benzyl, methylnaphthyl and the like, or an aromatic radical such as aryl, i.e., phenyl, toluyl, napthyl, anthracyl and the like; carboxy aryl, i.e., carboxy phenyl, carboxy naphthyl and the like; alkoxy aryl such as anisyl, hydroxy aryl such as salicyl and $R^3$ is hydrogen, amino, an aliphatic radical such as alkyl as above, hydroxy alkyl such as hydroxy methyl, hydroxy isobutyl and the like; aminoalkyl such as amino methyl, amino ethyl, and the like; alkoxy alkyl such as methoxy methyl, ethoxy methyl and the like; aryloxy alkyl such as phenoxy methyl and the like; cycloalkyl such as cyclohexyl and the like, aryl such as phenyl, toluyl, naphthyl and the like, hydroxy aryl such as salicyl and the like, amino aryl such as o-, m-, p-amino phenyl and the like; alkoxy aryl such as o-, m-, p-methoxy phenyl and the like;

represent an amino radical selected from the group consisting of mono- and dicyclohexylamino radicals, mono- and di-alkylamino radicals containing 8 to 16 alkyl carbon atoms, and di-o-tolylguanidino.

It was surprisingly and unexpectedly found that not only could rigid and resilient polyurethane foams be whitened according to this invention, but that they could be stabilized against discoloration, by incorporating from about 0.001 to about 0.5%, preferably 0.005 to 0.05%, by weight of one of the spirit- or oil-soluble brighteners, recited above, into a polyurethane foamable mixture containing water, basic catalysts, surfactants, cell regulators, pigments and the like. Moreover, it was unexpected that the spirit-soluble brighteners, useful for this invention, are stable in tolylene diisocyanate and do not cause polymerization of the diisocyanate, since so many products, such as tertiary amines do cause polymerization.

Representative examples of the whiteners and stabilizers, useful for this invention follow:

4 methyl-7-diethylaminocoumarin
4 methyl-7-dimethylaminocoumarin
4 methyl-7-bis (beta hydroxethyl) aminocoumarin
4 methyl-7-ethanolaminocoumarin
The cyclohexylamine salt of 4,5-diphenylimidazolone disulfonic acid
The dicyclohexylamine salt of 4,5-diphenylimidazolone disulfonic acid
4-formylamino-1.8-naphthalimide
4-acetylamino-1.8-naphthalimide
4-benzoylamino-1.8-naphthalimide
4-acetylamino-N-n-butyl-1.8-naphthalimide
4-acetylamino-N-n-octyl-1.8-naphthalimide
4-acetylamino-N-n-tetradecyl-1.8-naphthalimide
4-acetylamino-N-n-octadecyl-1.8-naphthalimide
4-benzoylamino-N-n-butyl-1.8-naphthalimide
4-benzoylamino-N-n-tetradecyl-1.8-naphthalimide 4-acetylamino-N-isobutyl-1.8-naphthalimide
4-salicylamino-N-methyl-1.8-naphthalimide
4-phenylacetylamino-N-propyl-1.8-naphthalimide
4-acetylamino-N-cyclohexyl-1.8-naphthalimide
4-benzoylamino-N-benzyl-1.8-naphthalimide
4-N-(amino-acetyl)-amino-N-methyl-1.8-naphthalimide
4-acetylamino-N-phenyl-1.8-naphthalimide
4-propionylamino-N-(p-methoxy)-phenyl - 1.8 - naphthalimide
4-benzoylamino-N-monoethanol-1.8-naphthalimide
4-acetylamino-N-carboxymethyl-1.8-naphthalimide
4-acetylamino-N-(p-carboxy)-phenyl-1.8-naphthalimide
4-acetylamino-N-salicyl-1.8-naphthalimide
4-carbamylamino-N-propyl-1.8-naphthalimide
4-glycocollyl-amino-N-n-butyl-1.8-naphthalimide
4-methoxyacetylamino-N-n-methyl-1.8-naphthalimide
4-phenoxyacetylamino-N-n-butyl-1.8-naphthalimide
4-hexahydrobenzoylamino-N-ethyl-1.8-naphthalimide
4-(p-amino)-benzoylamino-N-isobutyl-1.8-naphthalimide
4-(o-methoxy)-benzoylamino-N-hexyl-1.8-naphthalimide Flexible or semi-flexible cellular products having either closed or open cells have heretofore been prepared by the reaction of a compound having terminal hydroxyl groups, or a combination of hydroxyl and carboxyl groups where the carboxyl number is not more than about 25, hereinafter called the major reactant, with a diisocyanate and water, the reaction mixture including a catalyst such as a tertiary amine, dispersing agents and pigments where desired.

The reactants may be mixed together in a single step procedure, or the diisocyanate may be first combined with the major reactant to produce a prepolymer. The prepolymer is then, in a separate step, mixed with water. Water causes the evolution of carbon dioxide and the prepolymer molecules join together with the formation of urea linkages.

The specific major reactants used to produce flexible and semi-flexible polyurethane foams include glycols (e.g., ethylene glycol, 1,2-propylene glycol, 1,3-propanediol, 1,2-butylene glycol, 1,4-butanediol, thiodiglycol, diethylene glycol, and 1,2-alkylene oxide modified glycols); polyhydroxy compounds such as castor oil; polyesters such as those formed by the condensation of a glycol with a dibasic acid, for example, a molar excess of diethylene glycol is reacted with adipic acid to prepare diethylene glycol adipate; alkyd resins made by the esterification of a dibasic acid with a polyhydroxy compound such as glycerol, pentaerythritol or trimethylolpropane, trimethylolethane; and polyether glycols such as polyethylene, polypropylene, polybutylene or polytetramethylene ether glycols. Among the dibasic acids that can be used are succinic, adipic, maleic, sebacic, azelaic, fumaric, and the like. The diisocyanates useful for the preparation of polyurethane include toluene - 2,4 - diisocyanate, 1,5 - naphthalene diisocyanate, cumene - 2,4 - diisocyanate, 4 - methoxy-1,3-phenylenediisocyanate, 2,4-diisocyanatodiphenylether, 5,6-dimethyl - 1,3 - phenylenediisocyanate, 2,4-dimethyl-1,3-phenylenediisocyanate, and others. The preferred diisocyanate is tolylene-2,4-diisocyanate. The preferred isomer mixture contains 80% tolylene-2,4-diisocyanate, and 20% tolylene-2,6-diisocyanate.

When preparing the cellular materials from the water foamable diisocyanate compositions it is desirable to employ as the tertiary amine catalyst N-methylmorpholine, diethylethanolamine, diethanolamine, triethylamine, and the like.

It is also known that dispersion of the catalyst and water in the polyisocyanate composition may be improved by incorporating surfactants, for example, polyoxyethylated vegetable oils, such as Emulphor, EL 719, which is prepared by reacting castor oil with 28 moles of ethylene oxide, or other surfactants such as ethylene oxide condensation products.

The following representative examples will better illustrate the nature of the present invention; however, the invention is not intended to be limited to these examples.

*Example 1*

A. 0.2 gram of 4-methyl-7-diethylaminocoumarin was dissolved in 200 grams of 80:20 mixture of tolylene-2,4-diisocyanate and tolylene-2,6-diisocyanate. The coumarin derivative dissolved readily and produced a bright blue fluorescence with no evidence of decomposition or polymerization of the diisocyanate after several weeks standing. 12.25 grams of this solution was foamed with 40 grams of a polyester, said polyester was made from 2,000 grams of polyoxyethylene vegetable oil as the emulsifier, 90 grams of water, 7.6 grams of diethylethanolamine and 10.0 grams of diethylene glycol adipate. The foam samples were cured at 80–90° C. over night in an electric oven.

B. 12.25 grams of a 80:20 mixture of tolylene-2,4-diisocyanate and tolylene-2,6-diisocyanate was foamed with 40 grams of a prefabricated polyester (made of same ingredients as polyester above). This foam sample was also cured at 80–90° C. over night in an electric oven.

The cured foam containing the whitening and stabilizing agent of this invention was not decolored and considerably whiter (both the exterior and interior) than the decolored standard cured foam.

C. Slices of the foam samples (made up in accordance with A and B above) were put in a Fadeometer for 3, 6, 12, 18 and 24 hours and again in each instance the treated polyurethane foam of this invention exhibited an unexpected light fastness over the decolored untreated standard foam.

*Example 2*

Example 1 was followed except that 0.012 gram of 4-methyl-7-diethylaminocoumarin was dissolved in 40 grams of the polyester. The results were the same for the foam treated with the whitening and stabilizing agent of Example 1, i.e., the treated polyurethane foam of this invention exhibited an unexpected whitened color and reduced rate of discoloration.

*Example 3*

Example 1 was followed except 0.1 gram of 4-acetylamino-N-n-butyl-1,8-naphthalimide was dissolved in 40 grams of the polyester. The results were the same for the cured foam invention as that obtained in Example 1, i.e., the polyurethane foam treated according to this invention was not decolored and was considerably whiter (both the exterior and interior) than the decolorized standard untreated foam. The results in the Fadeometer were the same for the treated polyurethane foam of this invention as that obtained in Example 1, i.e., the foam of this invention exhibited better light fastness than the untreated decolored standard foam.

*Example 4*

Example 1 was followed except 0.2 gram of the dicyclohexylamine salt of sulfonated diphenylamidazolone was dissolved in 40 grams of the polyester. The results were the same for the cured foam of this invention as that obtained in Example 1, i.e., the polyurethane foam treated according to this invention was not decolored and was considerably whiter (both the exterior and interior) than the decolorized untreated standard foam. The results in the Fadeometer were the same for the treated polyurethane foam of this invention as that obtained in Example 1, i.e., the foam of this invention exhibited better light fastness than the untreated decolored standard foam.

*Example 5*

Example 1 was followed except 0.1 gram of 4-methyl-7-bis(beta hydroxyethyl)aminocoumarin was dissolved in 40 grams of the polyester. The results were the same for the cured foam of this invention as that obtained in Example 1, i.e., the polyurethane foam treated according to this invention was not decolored and was considerably whiter (both the exterior and interior) than the decolorized untreated standard foam.

It is to be understood that the foregoing detailed description is given merely by way of illustration and that many variations may be made therein without departing from the spirit of this invention.

It is claimed:

1. A cured polyurethane foam product whitened and stabilized against decoloration, said product having incorporated therein from about 0.001 to about 0.5% by weight of a compound selected from the group consisting of compounds having the structures:

(A) 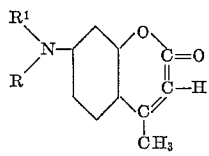

(B) 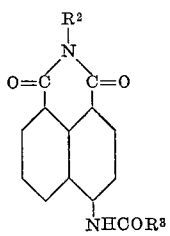

and (C) 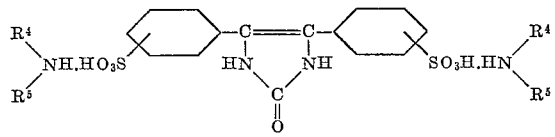

wherein R and $R^1$ is a radical selected from the group consisting of hydrogen, lower alkyl, lower hydroxyalkyl radicals; $R^2$ is a radical selected from the group consisting of hydrogen, alkyl, aryl radical; $R^3$ is a radical selected from the group consisting of hydrogen, amino, an alkyl radical;

represent an amino radical selected from the group consisting of mono- and dicyclohexylamino radicals, mono- and di-alkylamino radicals containing 8 to 16 alkyl carbon atoms, and di-o-tolylguanidino.

2. A cured polyurethane foam product whitened and stabilized against decoloration when exposed to the air by having incorporated therein from about 0.001 to about 0.5% by weight of 4-methyl-7-diethylaminocoumarin.

3. A cured polyurethane foam product whitened and stabilized against yellowing by having incorporated therein from about 0.001 to 0.5% by weight of 4-methyl-7-bis(beta-hydroxyethyl)aminocoumarin.

4. A polyurethane foam product whitened and stabilized against yellowing by having incorporated therein from about 0.001 to 0.5% by weight of 4-acetylamino-N-n-butyl-1,8-naphthalimide.

5. A polyurethane foam product whitened and stabilized against decoloration by having incorporated therein about 0.001 to abou 0.5% by weight of the dicyclohexylamine coumarin.

6. A polyurethane foam product whitened and stabilized against decoloration by having incorporated therein about 0.001 to about 0.5% by weight of the dicyclohexylamine salt of sulfonated diphenylamidazolone.

7. A cured polyurethane foam product whitened and stabilized against decoloration when exposed to the air by having incorporated therein from about 0.001 to about 0.5% by weight of 4-methyl-7-dimethylaminocoumarin.

References Cited in the file of this patent
UNITED STATES PATENTS

| | | |
|---|---|---|
| 2,680,747 | Williams et al. | June 8, 1954 |
| 2,709,702 | Williams et al. | May 31, 1955 |
| 2,764,565 | Hoppe et al. | Sept. 25, 1956 |
| 2,903,430 | Butler | Sept. 8, 1959 |
| 2,984,645 | Hoeschele | May 16, 1961 |